March 11, 1958  J. G. McQUEEN  2,826,689
SIGNAL PROCESSING ARRANGEMENTS
Filed Nov. 4, 1955
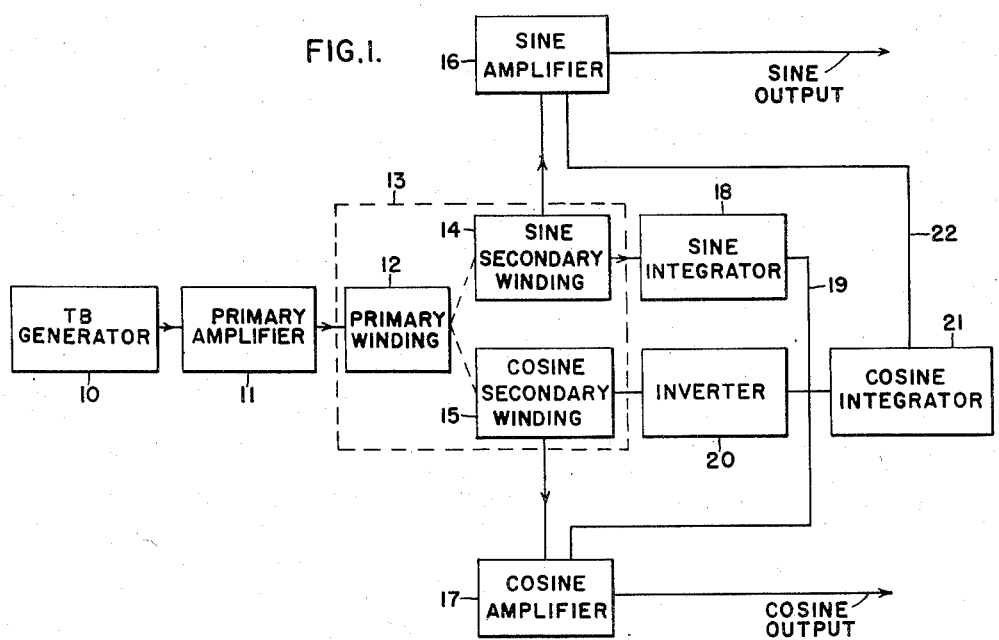
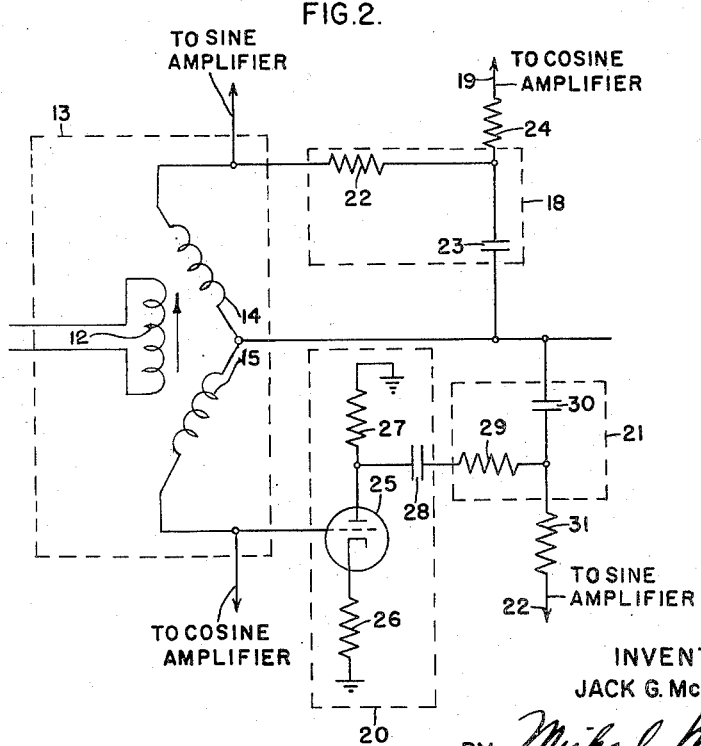
INVENTOR:
JACK G. McQUEEN,
BY Michael Masnik
HIS AGENT.

United States Patent Office 2,826,689
Patented Mar. 11, 1958

2,826,689

SIGNAL PROCESSING ARRANGEMENTS

Jack Gordon McQueen, Irlam, England, assignor to Metropolitan-Vickers Electrical Company Limited, a British company Application November 4, 1955, Serial No. 545,060

Claims priority, application Great Britain January 20, 1954

4 Claims. (Cl. 250—27)

This invention relates to an improved signal processing arrangement, and particularly apparatus for resolving electrical waveforms into amplitude modulated component waveforms.

It has often been necessary to resolve electrical waveforms into components amplitude modulated by the sine and cosine of a determinable angle. A particular example of a requirement of this type is presented by the deflection coil for a magnetic-deflection cathode-ray tube. This requirement is most often encountered in the azimuth PPI sweep of a radar system.

Such resolution may be effected by means of a transformer having relatively rotating primary and secondary windings and phase displaced secondaries, for example, a continuously rotated synchro.

The two secondary windings will be so arranged that the amplitude of the waveform induced in one of the secondaries will follow a sine law and the amplitude of the corresponding waveform induced in the other secondary will follow a cosine law. This application of synchro resolvers is well known to the art.

However, with such arrangements the generator action resulting from the rotation tends to introduce an unwanted component in the secondaries which will cause distortion of the output waveforms. The unwanted component becomes increasingly apparent as the sweep speed of the azimuth PPI is increased.

If the instantaneous flux is expressed as $f(t)$, then $f'(t)$ is proportional to the applied waveform where $$f'(t) = \frac{d}{dt} f(t)$$

The instantaneous flux linkages in the sine secondary winding are proportional to $f(t) \sin wt$, where $w$ is the angular velocity of rotation. Hence, the voltage induced in the sine secondary, $Vs$, is given by Equation 1.

$$Vs \propto f'(t) \sin wt + wf(t) \cos wt \qquad (1)$$

The first term represents the sinusoidally resolved input waveform, but the second term is an unwanted term arising from generator action.

Similarly, the voltage induced in the cosine secondary winding $Vc$, may be expressed by Equation 2.

$$Vc \propto f'(t) \cos wt - wf(t) \sin wt \qquad (2)$$

The main object of the invention is to provide an improved method and arrangement in which the unwanted terms in Equations 1 and 2 are substantially eliminated.

It is another object of my invention to provide method and means for removing this unwanted component from the resolved waveform at very rapid azimuth PPI sweep speeds.

Another object of my invention is to provide an improved signal processing method and arrangement.

To this end, according to one embodiment of the present invention, the output from each secondary winding is integrated and applied in the appropriate sense to the other winding in such a manner as to compensate for the unwanted component voltages induced in the secondary windings by generator action.

In carrying out the invention in accordance with one modification, the input waveform may be applied to the primary of the transformer through an amplifier, and correction may be made for transformer losses, such as leakage inductance, copper losses and iron losses by an auxiliary output circuit containing components so chosen that a voltage is produced corresponding to the above losses, and this voltage is fed back to an early stage of the amplifier in such a sense as to compensate for the losses. Restoration means may also be provided for holding the output waveforms at a required potential level such as earth, by effecting a restoration action during the intervals between sweeps and maintaining the control action during the ensuing sweep.

The features of my invention which I believe to be novel are set forth with particularity in the appended claims. My invention, itself, however, both as to its organization and method of operation, together with further objects and advantages thereof, may best be understood by reference to the following description taken in connection with the accompanying drawings, in which:

Figure 1 is a block diagram of a resolver in accordance with the present invention.

Figure 2 is a schematic diagram of a resolver and integrating circuits in accordance with the present invention.

Figure 1 shows in block form one embodiment of a sine-cosine resolving apparatus. The waveform to be resolved, e. g., a saw-tooth waveform, is generated in a time base generator 10. This is passed through a primary circuit amplifier 11 to the primary winding 12 of a sine-cosine rotary transformer 13, such as a synchro. The transformer has two secondary windings shown as a sine secondary winding 14 and cosine secondary winding 15. The output from the sine secondary winding is amplified, preferably in a D. C. feedback amplifier 16 and fed to an output circuit and similarly the output from the cosine secondary winding 15 is fed through an amplifier 17 to the cosine output.

In order to correct for generator distortion or losses in the transformer, the output from the sine secondary winding is integrated in an integrating circuit 18 and fed to the cosine amplifier 17 through connection 19. Similarly, the output from the cosine secondary winding is phase inverted in the inverter 20 and the integrated in the cosine integrator circuit 21 and fed to the sine amplifier circuit 16 through connection 22.

The operation of the circuit shown in Figure 1 is the following:

The voltage output from the sine secondary winding, $Vs$, is given by Equation 3.

$$Vs = A[f'(t) \sin wt + wf(t) \cos wt] \qquad (3)$$

Equation 3 expresses the same relationship as Equation 1, but with A being an arbitary constant in Equation 3.

The voltage output from the cosine secondary winding, $Vc$, is given by Equation 4.

$$Vc = B[f'(t) \cos wt - wf(t) \sin wt] \qquad (4)$$

Equation 4 expresses the same relationship as Equation 2, but with B being an arbitrary constant in Equation 4.

The sine integrator will integrate the voltage given in Equation 3 producing the voltage $Vsi$, expressed in Equation 5.

$$Vsi = Cf(t) \sin wt \qquad (5)$$

where C is an arbitrary constant.

The integrated voltage is now fed through lead 19 and combined with $Vc$ (Equation 4) in the cosine amplifier. By adjustment of circuit parameters, it is possible to vary B, C, and W. If the parameters are so adjusted that $C=WB$, the unwanted component caused by generator action will be completely eliminated. Although the ideal condition is difficult to attain in practice, it is possible to substantially reduce the unwanted component.

The same basic theory is used for reduction of the unwanted component, caused by generator action in the voltage from the sine winding. Because of the sign of the terms, a phase inverter is used before integration. The result of phase inversion and integration of the cosine voltage $V_c$ (Equation 4) is given by Equation 6.

$$V_{ci} = Df(t) \cos wt \qquad (6)$$

where D is an arbitrary constant.

The voltage $V_{ci}$ is now fed through lead 22 and combined with $V_s$ (Equation 3). Again, adjustment of the circuit parameters to make $D=WA$ will completely eliminate the unwanted term.

The output of sine and cosine components are thus substantially free from the distortion caused by generator action.

Figure 2 shows one embodiment of a circuit arrangement suitable for use in a sine-cosine resolving apparatus.

The elements similar to those of Figure 1 are identically numbered.

The resolver 13 is shown to have a primary winding 12, a sine secondary winding 14, and a cosine secondary winding 15.

The output from the sine secondary winding is fed directly to the sine amplifier circuit (16, Figure 1) and in addition, it is fed to an integrating circuit 18 formed by resistor 22 and capacitor 23. This circuit will integrate the applied voltage in a manner well known in the art and the integrated voltage is fed through resistance 24 to the cosine amplifier circuit so as to correct for the error due to generator action. Similarly, the output from the cosine secondary 15 is fed through a phase reversing stage comprising the triode 25, the cathode resistor 26, and the load resistor 27 and the coupling condenser 28 to the cosine integrating circuit formed by resistor 29 and capacitor 30. The integrated output voltage is fed through resistor 31 to the sine amplifier circuit (16, Figure 1) over lead 22 in such a manner as to compensate for the generator component in the waveform fed to this circuit.

The sine and cosine amplifiers of Figure 1 may each comprise D. C. amplifiers with feed back to the grid of the first tube. In this case, the integrated outputs referred to above may be fed to the grid of the first tube in the appropriate D. C. amplifier.

While a specific embodiment has been shown and described, it will, of course, be understood that various modifications may yet be devised by those skilled in the art which will embody the principles of the invention and found in the true spirit and scope thereof.

What I claim as new and desire to secure by Letters Patent of the United States is:

1. In combination, generating means for producing a recurrent saw-tooth voltage, a first amplifying means, means coupling said first amplifying means to said generating means, resolver means, means coupling said amplifying means to said resolver means, said resolver means comprising a primary, a first secondary, and a second secondary winding, a second amplifying means, means coupling said first secondary winding to said second amplifying means, a third amplifying means, means coupling said third amplifying means to said second secondary winding, a first integrating means, means coupling said first integrating means to said first secondary winding, and to said third amplifying means, a phase inverting means, means coupling said inverting means to said second secondary winding, a second integrating means, means coupling said second integrating means to said inverting means, and to said second amplifying means, a first output means, coupled to said second amplifying means, and a second output means, coupled to said third amplifying means.

2. In combination, a synchro having a primary winding, a first secondary winding, and a second secondary winding, a serially connected first resistor and first capacitor connected across said first secondary winding, a phase inversion means, a second resistor, and a second capacitor, said phase inversion means, second resistor, and second capacitor being serially connected across said second secondary winding, a first amplifying means, means coupling said first amplifying means with the junction between said first secondary winding and said first resistor, means coupling said amplifying means with the junction between said second resistor and second capacitor, and a second amplifying means, means coupling said second amplifying means with the junction between said phase inversion means and said second secondary winding, means coupling said second amplifying means with the junction between said first resistor and said first capacitor.

3. In combination, a signal source, means for resolving said signal into sine modulated and cosine modulated component waveforms, means for integrating said sine modulated component waveforms to derive a first integrated signal, means for integrating said cosine modulated component to derive a second integrated signal, means for adding said first integrated signal to said cosine modulated waveform, and means for subtracting said second integrated signal from said sine modulated waveform.

4. In combination, means for generating a first signal, resolver means comprising a primary winding rotatably displaceable from a reference point and a first and second phase displaced secondary windings, means for coupling said generating means to said primary winding, means for deriving from said first secondary winding a second signal whose amplitude varies as said first signal modulated by the sine of the angular displacement of said primary winding from said reference point, means for deriving from said second secondary winding a third signal whose amplitude varies as said first signal modulated by the cosine of the angular displacement of said primary winding from said reference point, means for integrating said second signal to derive a fourth signal, means for adding said fourth signal to said third signal, means for integrating said third signal to derive a fifth signal, and means for subtracting said fifth signal from said second signal.

References Cited in the file of this patent
UNITED STATES PATENTS

| | | |
|---|---|---|
| 2,727,224 | Adkins | Dec. 13, 1955 |
| 2,751,555 | Kirkpatrick | June 19, 1956 |